(12) United States Patent
Yu

(10) Patent No.: US 11,075,881 B2
(45) Date of Patent: Jul. 27, 2021

(54) PROXY BETWEEN WIRELESS LOCAL AREA NETWORK INFRASTRUCTURES

(71) Applicant: ARRIS Enterprises LLC, Suwanee, GA (US)

(72) Inventor: Haokeng Yu, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/580,531

(22) PCT Filed: Jul. 7, 2017

(86) PCT No.: PCT/CN2017/092266
§ 371 (c)(1),
(2) Date: Dec. 7, 2017

(87) PCT Pub. No.: WO2019/006756
PCT Pub. Date: Jan. 10, 2019

(65) Prior Publication Data
US 2020/0145372 A1 May 7, 2020

(51) Int. Cl.
*H04L 29/12* (2006.01)
*H04L 29/08* (2006.01)
(Continued)

(52) U.S. Cl.
CPC ...... *H04L 61/2528* (2013.01); *H04L 61/2015* (2013.01); *H04L 61/6013* (2013.01);
(Continued)

(58) Field of Classification Search
CPC .............. H04L 61/2528; H04L 61/6022; H04L 67/2814; H04L 61/2015; H04L 61/6013; H04L 67/1087; H04W 76/14
(Continued)

(56) References Cited

U.S. PATENT DOCUMENTS 9,525,566 B2 * 12/2016 Johnston-Watt .... H04L 41/0663
10,541,966 B1 * 1/2020 Wei .................... H04L 61/2521
(Continued)

FOREIGN PATENT DOCUMENTS

CN 1825828 A 8/2006
CN 101820434 A 9/2010
(Continued)

OTHER PUBLICATIONS

PCT International Search Report & Written Opinion, Re: Application No. PCT/CN2017/092266, dated Mar. 27, 2018.
(Continued)

*Primary Examiner* — David R Lazaro
*Assistant Examiner* — Berhanu Shitayewoldetadik
(74) *Attorney, Agent, or Firm* — Wenderoth, Lind & Ponack, L.L.P.

(57) ABSTRACT

Methods, systems, and computer readable media can be operable to facilitate communication between devices that are configured according to different wireless network infrastructures. A subscriber access device may include a proxy having a virtual station and a virtual P2P client, and the subscriber access device may be conductively connected to an access point and a P2P group owner. The P2P group owner may establish a P2P group including one or more P2P clients that are within range of the subscriber access device. The proxy may bridge traffic between a legacy network and a P2P group. For example, the proxy may forward messages received over a legacy network to one or more P2P clients included within a P2P group, and the proxy may forward messages received from a P2P client of the P2P group to one or more devices configured to communicate with the subscriber access device over the legacy network.

18 Claims, 5 Drawing Sheets

(51) Int. Cl.
*H04W 76/14* (2018.01)
*H04L 15/16* (2006.01)
*H04L 12/24* (2006.01)
*H04L 12/911* (2013.01)

(52) U.S. Cl.
CPC ...... *H04L 61/6022* (2013.01); *H04L 67/1087* (2013.01); *H04L 67/2814* (2013.01); *H04W 76/14* (2018.02)

(58) Field of Classification Search
USPC .......................................................... 709/245
See application file for complete search history.

(56) References Cited

U.S. PATENT DOCUMENTS

| | | | | |
|---|---|---|---|---|
| 2002/0035594 | A1* | 3/2002 | Dreke | H04L 41/12 709/203 |
| 2003/0018806 | A1* | 1/2003 | Rueger | H04W 88/184 709/238 |
| 2004/0053629 | A1* | 3/2004 | Rueger | H04W 4/12 455/466 |
| 2005/0180345 | A1* | 8/2005 | Meier | H04W 80/00 370/310 |
| 2006/0121906 | A1* | 6/2006 | Stephens | H04W 24/00 455/446 |
| 2007/0064702 | A1* | 3/2007 | Bates | H04L 67/104 370/392 |
| 2007/0211738 | A1* | 9/2007 | Guo | H04L 65/104 370/401 |
| 2008/0133758 | A1* | 6/2008 | Lee | H04L 67/28 709/227 |
| 2009/0044280 | A1* | 2/2009 | Wu | H04L 63/0281 726/26 |
| 2009/0209265 | A1* | 8/2009 | Kwon | H04W 24/02 455/454 |
| 2010/0169442 | A1* | 7/2010 | Liu | H04L 67/1002 709/206 |
| 2010/0169964 | A1* | 7/2010 | Liu | H04L 67/1063 726/12 |
| 2011/0082939 | A1* | 4/2011 | Montemurro | H04L 69/24 709/227 |
| 2011/0082940 | A1* | 4/2011 | Montemurro | H04L 61/1541 709/227 |
| 2013/0065627 | A1* | 3/2013 | Jung | H04W 52/0241 455/515 |
| 2013/0286889 | A1* | 10/2013 | Cherian | H04L 63/18 370/254 |
| 2014/0056290 | A1* | 2/2014 | Pazhyannur | H04L 12/4625 370/338 |
| 2014/0064246 | A1* | 3/2014 | Baillargeon | H04L 61/2592 370/331 |
| 2014/0341109 | A1* | 11/2014 | Cartmell | H04L 43/50 370/328 |
| 2014/0364094 | A1* | 12/2014 | Blackwell | H04M 1/72469 455/414.1 |
| 2015/0016417 | A1* | 1/2015 | Dees | H04W 88/08 370/331 |
| 2015/0013485 | A1 | 5/2015 | Verwoerd | |
| 2015/0172228 | A1* | 6/2015 | Zalepa | H04L 12/1813 709/206 |
| 2015/0181633 | A1* | 6/2015 | Kim | H04W 76/14 370/329 |
| 2015/0264123 | A1* | 9/2015 | Smadi | H04W 84/20 709/206 |
| 2015/0264616 | A1* | 9/2015 | Chen | H04W 36/38 370/331 |
| 2015/0319270 | A1* | 11/2015 | Roeland | H04L 61/6013 370/254 |
| 2016/0150005 | A1* | 5/2016 | Choi | H04L 12/66 455/435.1 |
| 2016/0234626 | A1* | 8/2016 | Ray | H04L 67/1044 |
| 2016/0353506 | A1* | 12/2016 | HomChaudhuri | H04W 76/15 |
| 2017/0013662 | A1* | 1/2017 | Qi | H04W 4/02 |
| 2017/0094670 | A1* | 3/2017 | Yang | H04W 72/082 |
| 2017/0264359 | A1* | 9/2017 | Bernsen | G06F 1/1632 |
| 2017/0264676 | A1* | 9/2017 | Rajamani | H04W 84/12 |
| 2018/0183937 | A1* | 6/2018 | Ofir | H04L 69/08 |
| 2018/0343693 | A1* | 11/2018 | Kim | H04W 4/21 |
| 2018/0368100 | A1* | 12/2018 | Kasirajan | H04W 8/02 |
| 2018/0376452 | A1* | 12/2018 | Wei | H04W 76/27 |
| 2019/0014508 | A1* | 1/2019 | Eriksson | H04W 40/36 |
| 2019/0058543 | A1* | 2/2019 | Stephenson | H04W 80/08 |
| 2019/0098680 | A1* | 3/2019 | Park | H04W 76/14 |
| 2019/0327135 | A1* | 10/2019 | Johnson | H04L 67/34 |

FOREIGN PATENT DOCUMENTS

| | | |
|---|---|---|
| CN | 105227692 A | 1/2016 |
| CN | 105227693 A | 1/2016 |

OTHER PUBLICATIONS

Extended European Search Report dated Nov. 9, 2020, in corresponding European Patent Application No. 17916701.0.
"Wi-Fi Peer-to-Peer (P2P) Technical Specification version 1.5", 2014, pp. 1-183.

\* cited by examiner

PROXY BETWEEN WIRELESS LOCAL AREA NETWORK INFRASTRUCTURES

TECHNICAL FIELD

This disclosure relates to the provisioning of a proxy between wireless local area network infrastructures.

BACKGROUND

One or more access points may be installed at a subscriber premise to provide a subscriber with a local network such as a wireless local area network (WLAN) for accessing multiple services that are delivered to the subscriber premise. The multiple services (e.g., video, voice, data, security, Internet of things (IoT), and others) may be delivered to multiple client devices, and the client devices may be configured to communicate using different standards, protocols, or networks (e.g., the client devices may include P2P (peer-to-peer) clients, wireless stations, etc.). According to a typical wireless network infrastructure, a router acts as an access point and central device to the network while other wireless devices operate as stations. The stations then rely on a connection with the access point for Internet access and data sharing over the wireless network. Many client devices now support WLAN Direct for communicating over a P2P group or network. In a P2P group, a group owner operates as a central device and controls wireless capabilities.

The different wireless networks available for use by client devices have limitations that create complications in a premise that includes different client devices supporting communication over different network types. For example, wireless stations generally do not support a direct connection or service discovery capability that can be exploited by upper layer applications. Moreover, stations are not able to operate without being connected to an access point. As another example, P2P devices typically do not have Internet access, are unable to be remotely controlled, and may not support Internet of things (IoT) functionality. Moreover, detection of a legacy device and service discovery are made difficult without WLAN Direct support. Further, P2P devices operating on a first band (e.g., 2.4 GHz band, 5 GHz band, etc.) cannot communicate with a P2P device operating on a different band.

Therefore, it is desirable to improve upon methods and systems for facilitating communication between devices that are configured according to different wireless infrastructures.

BRIEF DESCRIPTION OF THE DRAWINGS

Like reference numbers and designations in the various drawings indicate like elements.

DETAILED DESCRIPTION

Methods, systems, and computer readable media can be operable to facilitate communication between devices that are configured according to different wireless network infrastructures. A subscriber access device may include a proxy having a virtual station and a virtual P2P client, and the subscriber access device may be conductively connected to an access point and a P2P group owner. The P2P group owner may establish a P2P group including one or more P2P clients that are within range of the subscriber access device. The proxy may bridge traffic between a legacy network and a P2P group. For example, the proxy may forward messages received over a legacy network to one or more P2P clients included within a P2P group, and the proxy may forward messages received from a P2P client of the P2P group to one or more devices configured to communicate with the subscriber access device over the legacy network.

Figure 1:
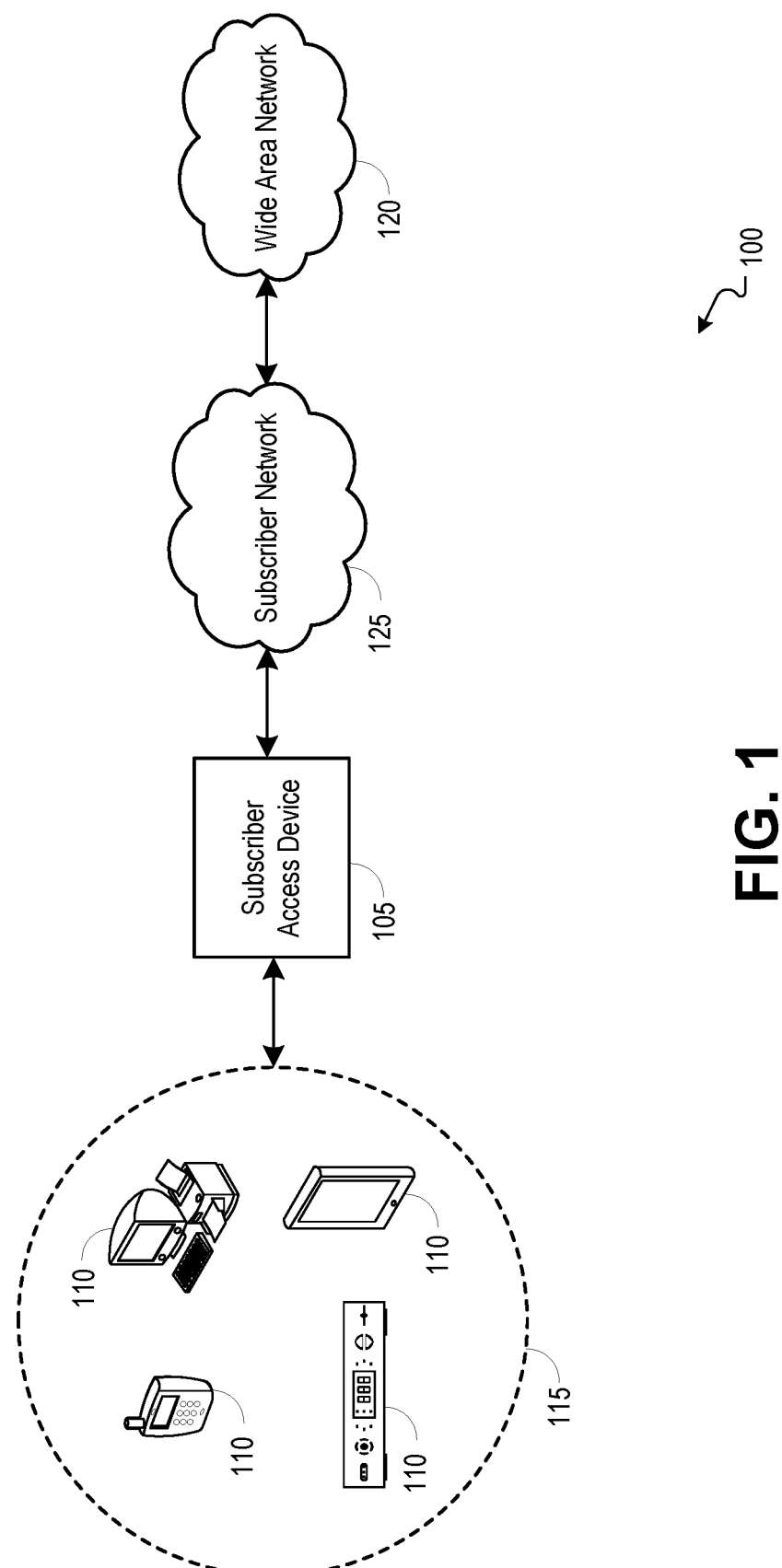
FIG. 1 is a block diagram illustrating an example network environment operable to facilitate communication between devices that are configured according to different wireless network infrastructures.

FIG. 1 is a block diagram illustrating an example network environment 100 operable to facilitate communication between devices that are configured according to different wireless network infrastructures. In embodiments, a subscriber access device 105 can route communications to and from one or more client devices 110. For example, the one or more client devices 110 can be provisioned to receive video service(s), data service(s), voice service(s), and/or home security service(s) through one or more subscriber access devices 105. In embodiments, a subscriber access device 105 can include a gateway, a cable modem, a wireless router including an embedded cable modem, a mobile hotspot router, a multimedia over coaxial alliance (MoCA) node, a wireless extender, and any access point or other device that is operable to route communications to and from a client device 110.

In embodiments, client devices 110 can include a wide variety of devices such as televisions, mobile devices, tablets, set-top boxes, computers, telephones, security devices, gaming consoles, IoT (Internet of things) devices, and any other device that is capable of utilizing a wireless video, data, telephony, communication, or security service. In embodiments, a subscriber access device 105 can provide one or more service sets (e.g., primary service set(s), subordinate service set(s), guest service set(s), data service set(s), video service set(s), IoT service sets, etc.), and the service sets can be identified using unique service set identifiers (SSID) and/or an inclusion of an interworking informational element in an advertisement of the capabilities for the service set. For example, the subscriber access device 105 may advertise an available service set by outputting a radio signal including an SSID associated with the service set and other information that may be used by a client device 105 to join the service set. One or more subscriber access devices 105 may provide a local network 115 (e.g., local area network (LAN), wireless local area network (WLAN), personal area network (PAN), etc.) for carrying communications between the subscriber access device(s) 105 and one or more associated client devices 110.

In embodiments, a client device 110 can identify a service set that is advertised by a subscriber access device 105, and the client device 110 may be configured to utilize the identified service set provided by the subscriber access device 105. Once a client device 110 is configured for communicating with a subscriber access device 105 through an identified service set, the client device 110 can receive content and/or services from upstream networks or servers (e.g., wide area network (WAN) 120), and can communicate with other client devices 110 connected through the same service set if the service set is configured to allow such a communication.

In embodiments, a subscriber access device 105 can route communications between client device(s) 110 and a WAN 120 via a subscriber network 125. The subscriber network 125 can include various networks such as Ethernet (e.g., CAT5/CAT6), coaxial cable, optical fiber, twisted pair network, satellite networks, mobile networks including 4G and LTE, and others.

Once authenticated with a service set offered by a subscriber access device 105, a client device 110 may communicate with the subscriber access device 105 over a wireless channel associated with the subscriber access device 105. For example, a requested service (e.g., data, video, telephony, home security, etc.) may be provided to a client device 110 using bandwidth available on the wireless channel. It will be appreciated by those skilled in the relevant art that with each additional client device 110 requesting a service through the subscriber access device 105, additional bandwidth on the wireless channel is consumed, and that the bandwidth consumed will vary with each service.

In embodiments, a client device 110 (i.e., enrollee or station) may initiate a communication exchange with the subscriber access device 105 or an associated access point. As an example, the communication exchange may be initiated per the Wireless Simple Configuration (WSC) specification, utilizing either the Push Button Configuration (PBC) (either soft or hard push button) or PIN method configuration methods. The subscriber access device 105 or associated access point may act as a proxy for the client device 110. It should be understood that the communication exchange (e.g., Wi-Fi protected setup (WPS)) may originate from either the subscriber access device 105 or the client device 110, and either the Push Button Method or PIN method may be utilized. In embodiments, the subscriber access device 105 may advertise support for WPS/WSC of only a single service (i.e., a default or private data service set). It will be appreciated by those skilled in the relevant art that when a WPS service is invoked, the exchange of communications between the subscriber access device 105 and client device 110 may follow the messaging format per the Wi-Fi Alliance Specification or other wireless standard. For example, the subscriber access device 105 may pass configuration information to a client device 110, the configuration information including information such as a service set identifier (SSID), authentication type, encryption type, passphrase or pre shared key, and/or others. The client device 110 may then be configured with the appropriate configuration information utilizing WLAN configuration commands.

In embodiments, configuration of a client device 110 (i.e., the enrollee) may be carried out by an access point and a registrar. It should be understood that the access point and registrar may be located within separate devices or a common device (e.g., subscriber access device 105). It will be appreciated that the enrollee and access point may communicate over various standards or protocols, including, but not limited to 802.11. Likewise, it will be appreciated that the access point and registrar may communicate over various standards such as universal plug and play (UPnP), and others. The enrollee may pass device type information to the registrar (via the access point) and the registrar may respond by passing service configuration information to the enrollee (via the access point).

In embodiments, a client device 110 may be configured to support a WPS connection with an access point, a WLAN Direct (e.g., P2P (peer-to-peer) or group network) connection with a P2P group owner, or other connection. The subscriber access device 105 may include both an access point configured to support the reception and transmission of communications over a WLAN and a P2P group owner configured to support the reception of communications from, and transmission of communications to one or more P2P devices.

In embodiments, the subscriber access device 105 may be configured to pass communications over a single band or over multiple bands. For example, the subscriber access device 105 may transmit and receive wireless communications over a plurality of bands (e.g., 2.4 GHz, 5 GHz, etc.). The access point and P2P group owner of the subscriber access device 105 may communicate with client devices 110 over the same wireless signal band utilizing different BSS (basic service set) domains or may communicate with client devices 110 over different wireless signal bands.

In embodiments, the subscriber access device 105 may, upon boot up, output probe requests and listen for probe responses on one or more channels of one or more wireless signal bands. For example, the subscriber access device 105 may output probe requests and listen for probe responses on social channels (e.g., commonly used channels such as channels 1, 6, and 11 in the 2.4 GHz band). The probe requests may include P2P information elements signaling support for P2P wireless communications, and the probe responses may include P2P information elements describing device and group characteristics of the client device 110 from which the probe response is received. Device characteristics of a client device 110 may include a user-defined device name, a device type, configuration methods supported by the client device 110, operating channels supported by the client device 110, and/or other information.

In embodiments, the subscriber access device 105 may create a P2P group by sending a group owner (GO) negotiation request to all unconnected client devices 110 and a P2P invitation request to each connected client device 110. The subscriber access device 105 may communicate a willingness to become the group owner by setting a GO intent attribute to a maximum value (e.g., by setting the GO intent attribute at 15 where the range is 0-15) and including the GO intent attribute in the GO negotiation request/response frames. When the subscriber access device 105 becomes the group owner, the subscriber access device 105 may send a group owner negotiation confirmation to each P2P client device 110, wherein the group owner negotiation confirmation includes an instruction for each of the P2P client devices 110 to move to the negotiated operating channel. The group owner of the subscriber access device 105 may begin operating in an AP-like mode by transmitting beacons with a negotiated SSID and group formation.

In embodiments, a client device 110 may connect to the group owner of the subscriber access device 105 to exchange credentials. For example, the subscriber access device 105 may enable a WPS mode, and client devices 110 may exchange credentials with the group owner of the subscriber access device 105 using the WPS protocol.

In embodiments, the group owner of the subscriber access device 105 and the client devices 110 may exchange encryption keys. For example, a robust security network (RSN) (WPA2) handshake may be utilized in the exchange of encryption keys. The group owner may assume the role of authenticator and each client device 110 may assume the role of supplicant. Each client device 110 may request an IP (Internet protocol) address (e.g., IPv4 address) from the group owner, and the group owner may respond by assigning and transmitting an IP address to each client device 110. The subscriber access device 105 may implement a DHCP (dynamic host configuration protocol) server supporting data transfer between the group owner and each of the one or more client devices 110.

In embodiments, the group formed by the group owner of the subscriber access device 105 may be made persistent, wherein each of the client devices 110 that have joined the group store the credentials and automatically re-connect with the group owner. The persistent group may use a different channel and/or different MAC addresses for each session.

In embodiments, only the group owner (e.g., the group owner of the subscriber access device 105) is allowed to cross-connect a client device 110 in the P2P group to an external network (e.g., WAN 120), thus, the connection may be made at the network layer (e.g., using network address translation (NAT)).

In embodiments, the WLAN Direct protocol may preclude the role of P2P group owner from being transferred within a P2P group, thus, when the group owner of the subscriber access device 105 leaves the P2P group, the P2P group is torn down.

In embodiments, the group owner of the subscriber access device 105 may ask each P2P client device for a description of services provided by the respective P2P client device. In response, each P2P client device may transmit a communication to the group owner, wherein the communication includes an identifier or descriptor associated with one or more services provided by the client device. Services provided by the P2P client devices may be advertised such that a connecting client device 110 may select an appropriate device with which to communicate. The subscriber access device 105 may advertise supported services and/or capabilities (e.g., Internet bridging, Internet connectivity, data tethering, remote control, network attached storage, DLNA (digital living network alliance), media server, etc.), and client devices 110 may identify services and/or capabilities supported by the subscriber access device 105 through the advertisement.

In embodiments, the subscriber access device 105 may include a proxy having a virtual station (STA) state-machine and virtual P2P client state-machine. The connections between the virtual STA state-machine and WLAN BSS network and the virtual P2P client state-machine and WLAN Direct Network may be conductive rather than over-the-air.

In embodiments, the proxy of the subscriber access device 105 may carry out transparent bridging between a legacy AP-STA network (e.g., WLAN BSS network) and a P2P group (e.g., WLAN Direct P2P group). For example, messages received at the proxy from a legacy AP-STA network may be forwarded to a P2P group, and messages received at the proxy from a P2P group may be forwarded to a legacy AP-STA network. A message transmitted from a P2P client may be received at a virtual P2P client of the subscriber access device 105. The proxy may modify the source IP and MAC addresses of the message and pass the message to a virtual station of the subscriber access device 105. The message may be output from the virtual station and may be transmitted to one or more stations by the access point of the subscriber access device 105. A message transmitted from a station may be received at the virtual station of the subscriber access device 105. The proxy may modify the source and/or destination IP and MAC addresses of the message and pass the message to the virtual P2P client of the subscriber access device 105. The message may be transmitted from the P2P client of the subscriber access device 105 to a P2P client designated by the destination addresses of the message.

Figure 2:
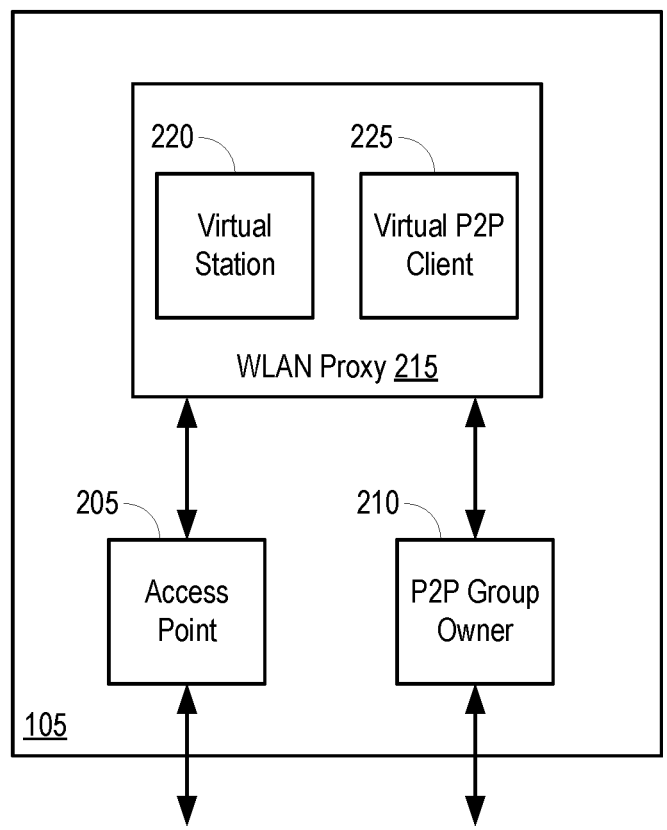
FIG. 2 is a block diagram illustrating an example subscriber access device operable to facilitate communication between devices that are configured according to different wireless network infrastructures.

FIG. 2 is a block diagram illustrating an example subscriber access device 105 operable to facilitate communication between devices that are configured according to different wireless network infrastructures. The subscriber access device 105 may include an access point 205, a P2P group owner 210, and a WLAN proxy 215. The WLAN proxy 215 may include a virtual station 220 and a virtual P2P client 225. The subscriber access device 105 may provide one or more services to one or more client devices (e.g., client devices 110 of FIG. 1), and the client devices may include wireless stations and/or P2P clients. Communications between the subscriber access device 105 and one or more client devices may be output from or received through the access point 205 or P2P group owner 210.

In embodiments, the access point 205 may be configured to support the reception and transmission of communications over a WLAN, and the P2P group owner 210 may be configured to support the reception of communications from, and transmission of communications to one or more P2P devices. The access point 205 and P2P group owner 210 may communicate with client devices over the same wireless signal band utilizing different BSS (basic service set) domains or may communicate with client devices over different wireless signal bands.

In embodiments, the P2P group owner 210 may create a P2P group by sending a group owner (GO) negotiation request to unconnected client devices (e.g., client devices 110 of FIG. 1) and a P2P invitation request to each connected client device. The P2P group owner 210 may communicate a willingness to become the group owner by setting a GO intent attribute to a maximum value and including the GO intent attribute in the GO negotiation request/response frames. The P2P group owner 210 may send a group owner negotiation confirmation to each P2P client device, wherein the group owner negotiation confirmation includes an instruction for each of the P2P client devices to move to the negotiated operating channel. The P2P group owner 210 may transmit beacons with a negotiated SSID and group formation.

In embodiments, the P2P group owner 210 may retrieve information identifying one or more services provided by one or more P2P client devices, and the P2P group owner 210 may advertise supported services and/or capabilities (e.g., Internet bridging, Internet connectivity, data tethering, remote control, network attached storage, DLNA (digital living network alliance), media server, etc.).

In embodiments, the WLAN proxy 215 may carry out transparent bridging between a legacy AP-STA network (e.g., WLAN BSS network) and a P2P group (e.g., WLAN Direct P2P group). For example, messages received at the WLAN proxy 215 from a legacy AP-STA network may be forwarded to a P2P group, and messages received at the WLAN proxy 215 from a P2P group may be forwarded to a legacy AP-STA network. A message transmitted from a P2P client may be received at a virtual P2P client 225 of the WLAN proxy 215. The WLAN proxy 215 may modify the source IP and MAC addresses of the message and pass the message to a virtual station 220 of the WLAN proxy 215. The message may be output from the virtual station 220 and may be transmitted to one or more stations by the access point 205 of the subscriber access device 105. A message transmitted from a station may be received at the virtual station 220 of the WLAN proxy 215. The WLAN proxy 215 may modify the source and/or destination IP and MAC addresses of the message and pass the message to the virtual P2P client 225 of the WLAN proxy 215. The message may be transmitted from the virtual P2P client 225 to a P2P client designated by the destination addresses of the message.

Figure 3:
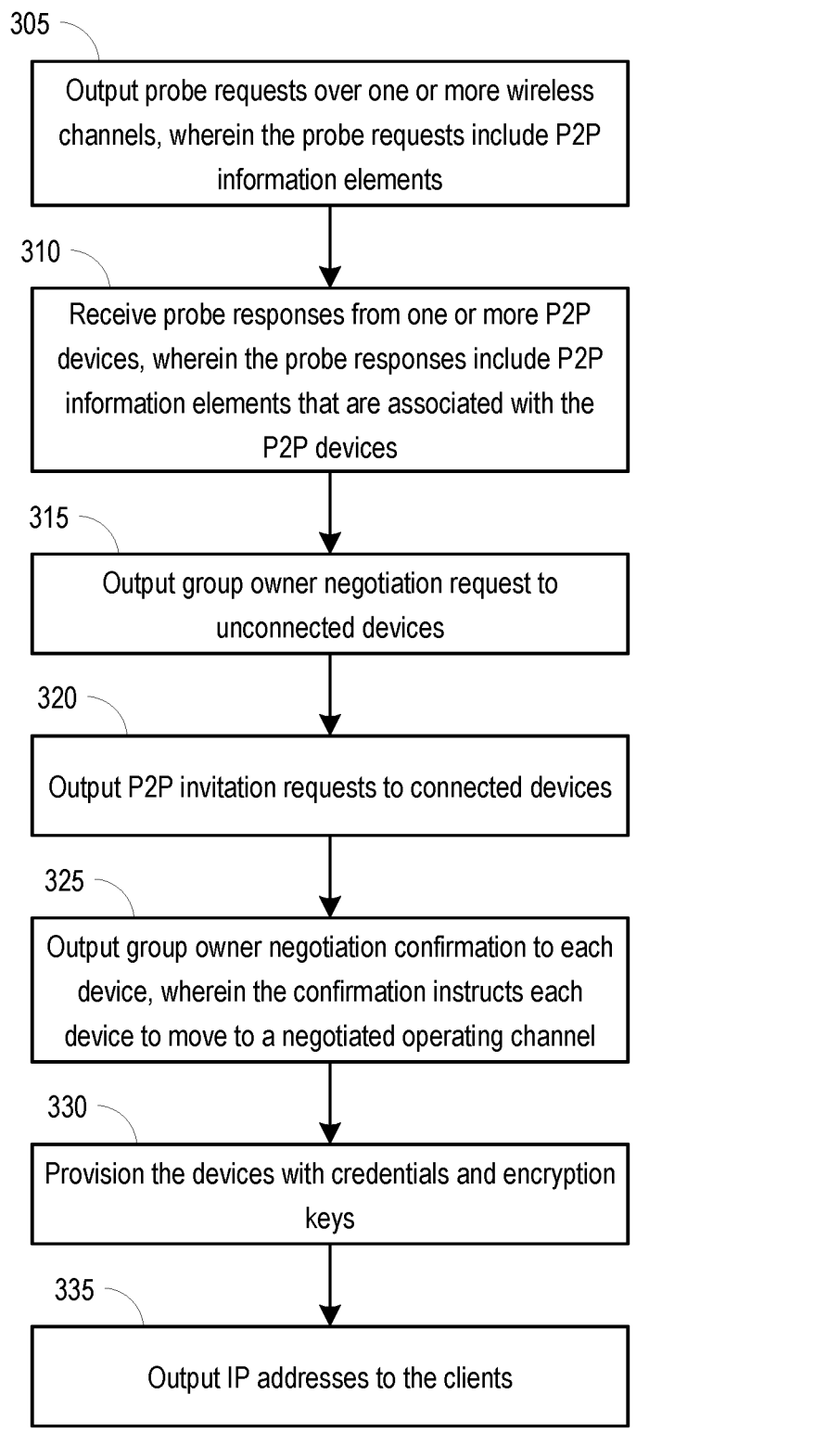
FIG. 3 is a flowchart illustrating an example process operable to facilitate the establishment of a P2P group.

FIG. 3 is a flowchart illustrating an example process 300 operable to facilitate the establishment of a P2P group. In embodiments, the process 300 may be carried out by a subscriber access device 105 of FIG. 1. The process 300 may start at 305, when probe requests are output over one or more wireless channels, wherein the probe requests include P2P information elements. The probe requests may be output, for example, by the subscriber access device 105. In embodiments, the subscriber access device 105 may, upon boot up, output probe requests on one or more channels of one or more wireless signal bands. For example, the subscriber access device 105 may output probe requests on social channels (e.g., commonly used channels such as channels 1, 6, and 11 in the 2.4 GHz band). The probe requests may include P2P information elements signaling support for P2P wireless communications.

At 310, probe responses may be received from one or more P2P devices, wherein the probe responses include P2P information elements that are associated with the P2P devices. The probe responses may be received, for example, at the subscriber access device 105. In embodiments, the subscriber access device 105 may, upon boot up, listen for probe responses on one or more channels of one or more wireless signal bands. For example, the subscriber access device 105 may listen for probe responses on social channels (e.g., commonly used channels such as channels 1, 6, and 11 in the 2.4 GHz band). The probe responses may include P2P information elements describing device and group characteristics of the device (e.g., client device 110) from which the probe response is received. Device characteristics of a client device 110 may include a user-defined device name, a device type, configuration methods supported by the client device 110, operating channels supported by the client device 110, and/or other information.

At 315, a group owner negotiation request may be output to unconnected devices. The group owner negotiation request may be output to unconnected devices (e.g., client devices 110 of FIG. 1 that are not currently connected to the subscriber access device 105), for example, by the subscriber access device 105 (e.g., by a P2P group owner 210 of FIG. 2). In embodiments, the P2P group owner 210 may create a P2P group by sending a group owner (GO) negotiation request to all unconnected client devices 110. The P2P group owner 210 may communicate a willingness to become the group owner by setting a GO intent attribute to a maximum value and including the GO intent attribute in the GO negotiation request.

At 320, P2P invitation requests may be output to connected devices. The P2P invitation requests may be output to connected devices (e.g., client devices 110 of FIG. 1 that are connected to the subscriber access device 105), for example, by the subscriber access device 105 (e.g., P2P group owner 210 of FIG. 2). In embodiments, the P2P group owner 210 may create a P2P group by sending a P2P invitation request to each connected client device 110.

At 325, a group owner negotiation confirmation may be output to each device, wherein the confirmation instructs each device to move to a negotiated operating channel. The group owner negotiation confirmation may be output to each device (e.g., client device 110 of FIG. 1 that has been added to the P2P group), for example, by the subscriber access device 105 (e.g., P2P group owner 210 of FIG. 2). In embodiments, the P2P group owner 210 may become the group owner of the created P2P group, and the P2P group owner 210 may begin operating in an AP-like mode by transmitting beacons with a negotiated SSID and group formation.

At 330, the devices of the P2P group may be provisioned with credentials and encryption keys. The devices may be provisioned with credentials and encryption keys, for example, by the subscriber access device 105. In embodiments, a client device 110 may connect to the P2P group owner 210 to exchange credentials. For example, the subscriber access device 105 may enable a WPS mode, and client devices 110 may exchange credentials with the P2P group owner 210 using the WPS protocol. In embodiments, the P2P group owner 210 and the client devices 110 may exchange encryption keys. For example, a robust security network (RSN) (WPA2) handshake may be utilized in the exchange of encryption keys.

At 335, IP addresses may be output to the clients. IP addresses may be output to the clients (e.g., client devices 110 that have been added to the P2P group), for example, by the subscriber access device 105. In embodiments, each client device 110 may request an IP address (e.g., IPv4 address) from the P2P group owner 210, and the P2P group owner 210 may respond by assigning and transmitting an IP address to each client device 110.

Figure 4:
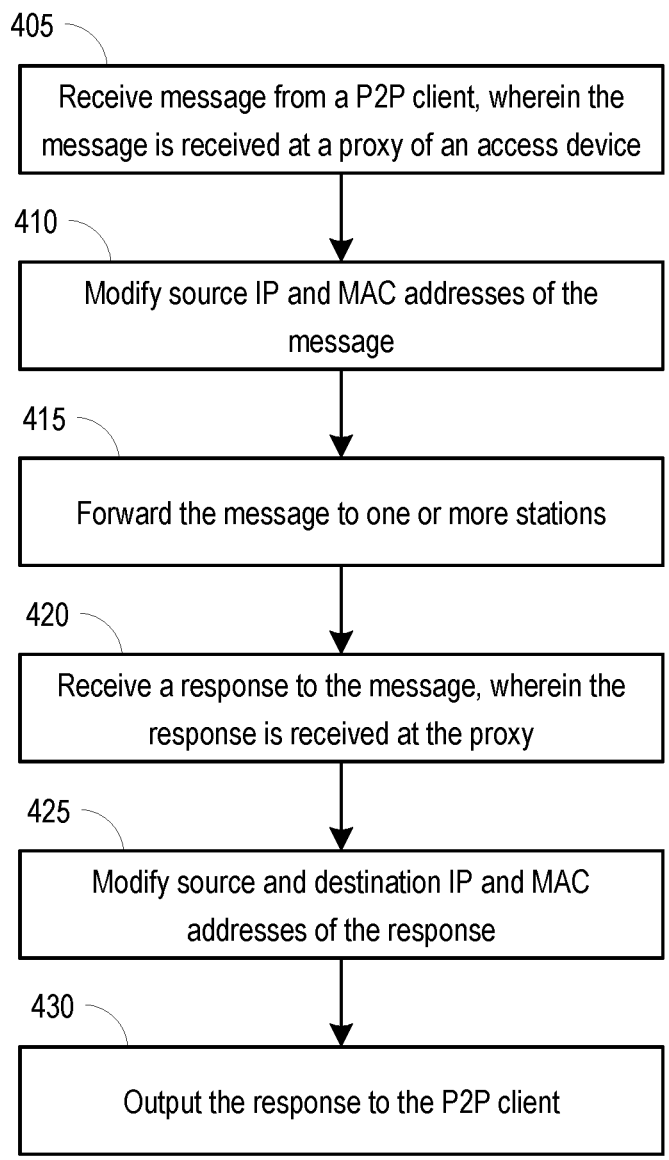
FIG. 4 is a flowchart illustrating an example process operable to facilitate the passage of messages between members of a P2P group and one or more wireless stations.

FIG. 4 is a flowchart illustrating an example process 400 operable to facilitate the passage of messages between members of a P2P group and one or more wireless stations. In embodiments, the process 400 may be carried out by a subscriber access device 105 of FIG. 1. The process 400 may start at 405, when a message is received from a P2P client. The message may be received at a proxy of the subscriber access device 105 (e.g., at the WLAN proxy 215 of FIG. 2). In embodiments, the message may be received at a virtual P2P client of the proxy (e.g., virtual P2P client 225 of FIG. 2).

At 410, source IP and MAC addresses of the message may be modified. The source IP and MAC addresses may be modified, for example, by the subscriber access device 105 (e.g., by a WLAN proxy 215 of FIG. 2). In embodiments, a small hook procedure may be utilized to modify IP/MAC addresses. For example, Iptables may be used to filter a destination IP address of an IP packet which belongs to an IP subnet that is opposite a WLAN. Based on the filtering, the IP/MAC addresses may be modified and sent through a kernel routing process, or the packet may be sent back towards a source (e.g., where IP address matches Iptables filter parameter, the IP/MAC address may be modified and sent through the kernel routing process). Each packet received at the proxy may be looped. It should be understood that other methods and procedures may be utilized to modify IP/MAC addresses.

At 415, the message may be forwarded to one or more stations. The message may be forwarded to one or more stations (e.g., client devices 110 of FIG. 1), for example, by an access point of the subscriber access device 105 (e.g., by the access point 205 of FIG. 2).

At 420, a response to the message may be received. The response to the message may be received from a station (e.g., client device 110) and may be received, for example, by the subscriber access device 105 (e.g., by the access point 205). In embodiments, the response may be received at a virtual station of the subscriber access device 105 (e.g., at the virtual station 220 of FIG. 2).

At 425, source and destination IP and MAC addresses of the response may be modified. The source and destination IP and MAC addresses may be modified, for example, by the subscriber access device 105 (e.g., by a WLAN proxy 215 of FIG. 2). In embodiments, a small hook procedure may be utilized to modify IP/MAC addresses. For example, Iptables may be used to filter a destination IP address of an IP packet which belongs to an IP subnet that is opposite a WLAN. Based on the filtering, the IP/MAC addresses may be modified and sent through a kernel routing process, or the packet may be sent back towards a source (e.g., where IP address matches Iptables filter parameter, the IP/MAC address may be modified and sent through the kernel routing process). Each packet received at the proxy may be looped. It should be understood that other methods and procedures may be utilized to modify IP/MAC addresses.

At 430, the response may be output to the P2P client. The response may be output to the P2P client (e.g., the P2P client from which the message was received), for example, by a P2P group owner of the subscriber access device 105 (e.g., by the P2P group owner 210 of FIG. 2).

Figure 5:
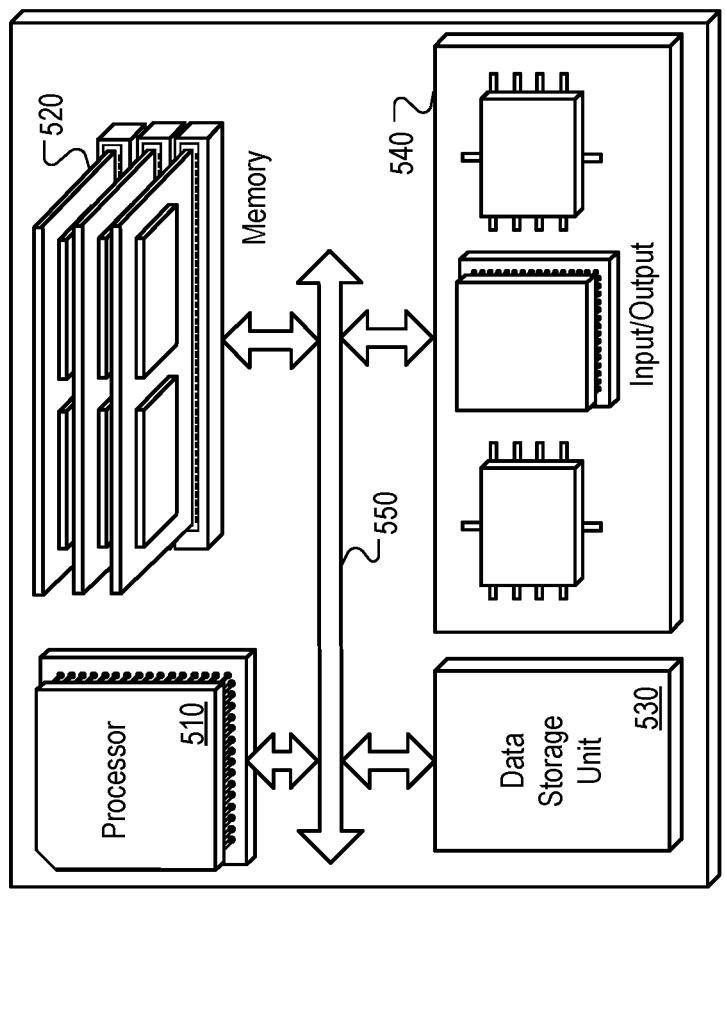
FIG. 5 is a block diagram of a hardware configuration operable to facilitate communication between devices that are configured according to different wireless network infrastructures.

FIG. 5 is a block diagram of a hardware configuration 500 operable to facilitate communication between devices that are configured according to different wireless network infrastructures. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a nonvolatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 125 of FIG. 1, WAN 120 of FIG. 1, local network 115 of FIG. 1, etc.) and/or one or more client devices (e.g., client devices 110 of FIG. 1). It should be understood that the communications protocols described herein are only examples and that various other inter-chip communication protocols may be used to support the methods, systems, and computer readable media described herein.

Those skilled in the art will appreciate that the invention improves upon methods and apparatuses for passing communications between different wireless network infrastructures. Methods, systems, and computer readable media can be operable to facilitate communication between devices that are configured according to different wireless network infrastructures. A subscriber access device may include a proxy having a virtual station and a virtual P2P client, and the subscriber access device may be conductively connected to an access point and a P2P group owner. The P2P group owner may establish a P2P group including one or more P2P clients that are within range of the subscriber access device. The proxy may bridge traffic between a legacy network and a P2P group. For example, the proxy may forward messages received over a legacy network to one or more P2P clients included within a P2P group, and the proxy may forward messages received from a P2P client of the P2P group to one or more devices configured to communicate with the subscriber access device over the legacy network.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method for facilitating communication between devices that are configured according to different wireless network infrastructures, via a proxy component of a subscriber access device that is configured to bridge traffic between peer-to-peer (P2P) clients of a P2P group that support WLAN Direct connection and legacy wireless stations (STAs) of a wireless local area network (WLAN) that do not support WLAN Direct connection with the P2P clients of the P2P group, the method comprising:
receiving a message from a P2P client of the P2P group, wherein the message is received at the proxy component of the subscriber access device and is directed to one or more of the legacy wireless STAs of the WLAN that do not support WLAN Direct connection with the P2P client of the P2P group;
modifying a source address of the message by the proxy component, wherein the modifying includes a filtering process using one or more IPtables;
transmitting the message from the subscriber access device to the one or more legacy wireless STAs of the WLAN;
receiving a response to the message from at least one of the one or more legacy wireless STAs of the WLAN, wherein the response is received at the proxy component of the subscriber access device and is directed to the P2P client of the P2P group that does not have WLAN Direct connection with the at least one of the one or more legacy wireless STAs of the WLAN from which the response was received;
modifying a source address and a destination address of the response to the message by the proxy component, wherein the modifying includes a filtering process using one or more IPtables; and
transmitting the response to the message from the subscriber access device to the P2P client of the P2P group from which the message was received.

2. The method of claim 1, wherein the P2P group is formed by a P2P group owner component of the subscriber access device that is connected to the proxy component of the subscriber access device.

3. The method of claim 2, wherein:
the message is received at a virtual P2P client state-machine of the proxy component of the subscriber access device from the P2P client of the P2P group via the P2P group owner component of the subscriber access device;
the proxy component of the subscriber access device:
modifies a source IP address of the message by filtering a destination IP address of the message which belongs to an IP subnet of the WLAN that is different than an IP subnet of the P2P group, and wherein when the destination IP address matches an IPtables filtering parameter, the source IP address of the message is modified to conform to the IP subnet of the WLAN and sent through a kernel routing process; and
passes the message to a virtual station state-machine of the proxy component of the subscriber access device, wherein the virtual station state-machine outputs the message to an access point component of the subscriber access device that is connected to the proxy component; and
the access point component of the subscriber access device transmits the message to the one or more legacy wireless STAs of the WLAN.

4. The method of claim 3, wherein:
the response is received at the virtual station state-machine of the proxy component of the subscriber access device from the at least one of the one or more legacy wireless STAs of the WLAN via the access point component of the subscriber access device; and
the proxy component of the subscriber access device:
modifies a source IP address and a destination IP address of the response to the message by filtering the destination IP address of the response which belongs to the IP subnet of the WLAN, wherein when the destination IP address matches an IPtables filtering parameter, the source IP address and the destination IP address of the response are modified to conform to the IP subnet of the P2P group and sent through a kernel routing process; and passes the message to the virtual P2P client state-machine of the proxy component of the subscriber access device, wherein the virtual P2P client state-machine outputs the response to the P2P group owner component of the subscriber access device; and the P2P group owner component of the subscriber access device transmits the response to the message to the P2P client of the P2P group.

5. The method of claim 4, wherein:

a connection between the proxy component and the P2P group owner component of the subscriber access device is electrically conductive rather than over-the-air;

the P2P client of the P2P group supports a WLAN Direct connection with the P2P group owner component of the subscriber access device for communicating with other members of the P2P group;

a connection between the proxy component and the access point component of the subscriber access device is electrically conductive rather than over-the-air; and the one or more legacy wireless STAs of the WLAN support a Wi-Fi protected setup (WPS) connection with the access point component of the subscriber access device for communicating over the WLAN but do not support a WLAN Direct connection with the P2P group owner component of the subscriber access device.

6. The method of claim 5, wherein:

the WLAN Direct connection between the P2P group owner component of the subscriber access device and the P2P client of the P2P group utilizes a first basic service set (BSS) or a first radio frequency (RF) band; and the WPS connection between the access point component of the subscriber access device and the one or more legacy wireless STAs of the WLAN utilizes a second BSS or a second RF band that is different from the first BSS or the first RF band.

7. A subscriber access device for facilitating communication between devices that are configured according to different wireless network infrastructures, the subscriber access device comprising:

a peer-to-peer (P2P) group owner component configured to receive a message from a P2P client of a P2P group that supports WLAN Direct connection, wherein the message is directed to one or more legacy wireless stations (STAB) of a wireless local area network (WLAN) that do not support WLAN Direct connection with the P2P client of the P2P group;

a proxy component for bridging traffic between P2P clients of the P2P group that support WLAN Direct connection and legacy wireless STAs of the WLAN that do not support WLAN Direct connection with the P2P clients of the P2P group, wherein the proxy component is configured to receive the message from the P2P group owner, and modify a source address of the message by performing a filtering process using one or more IP tables; and an access point component configured to:

receive the message from the proxy component, and transmit the message from the subscriber access device to the one or more legacy wireless STAs of the WLAN; and receive a response to the message from at least one of the one or more legacy wireless STAs of the WLAN, wherein the response is directed to the P2P client of the P2P group that does not have WLAN Direct connection with the at least one of the one or more legacy wireless STAs of the WLAN from which the response was received;

wherein the proxy component is further configured to receive the response to the message from the access point component, and modify a source address and a destination address of the response by performing a filtering process using the one or more IP tables; and wherein the P2P group owner component is further configured to receive the response to the message from the proxy component, and transmit the response from the subscriber access device to the P2P client of the P2P group from which the message was received.

8. The subscriber access device of claim 7, wherein the P2P group is formed by the P2P group owner component of the subscriber access device, and the P2P group owner component is connected to the proxy component of the subscriber access device.

9. The subscriber access device of claim 8, wherein:

the message is received at a virtual P2P client state-machine of the proxy component of the subscriber access device from the P2P client of the P2P group via the P2P group owner component of the subscriber access device;

the proxy component of the subscriber access device:

modifies a source IP address of the message by filtering a destination IP address of the message which belongs to an IP subnet of the WLAN that is different than an IP subnet of the P2P group, and wherein when the destination IP address matches an IPtables filtering parameter, the source IP address of the message is modified to conform to the IP subnet of the WLAN and sent through a kernel routing process; and passes the message to a virtual station state-machine of the proxy component of the subscriber access device, wherein the virtual station state-machine outputs the message to the access point component of the subscriber access device; and the access point component of the subscriber access device transmits the message to the one or more legacy wireless STAs of the WLAN.

10. The subscriber access device of claim 9, wherein:

the response is received at the virtual station state-machine of the proxy component of the subscriber access device from the at least one of the one or more legacy wireless STAs of the WLAN via the access point component of the subscriber access device; and the proxy component of the subscriber access device:

modifies a source IP address and a destination IP address of the response to the message by filtering the destination IP address of the response which belongs to the IP subnet of the WLAN, wherein when the destination IP address matches an IPtables filtering parameter, the source IP address and the destination IP address of the response are modified to conform to the IP subnet of the P2P group and sent through a kernel routing process; and passes the message to the virtual P2P client state-machine of the proxy component of the subscriber access device, wherein the virtual P2P client state-machine outputs the response to the P2P group owner component of the subscriber access device; and the P2P group owner component of the subscriber access device transmits the response to the message to the P2P client of the P2P group.

11. The subscriber access device of claim 10, wherein:
a connection between the proxy component and the P2P group owner component of the subscriber access device is electrically conductive rather than over-the-air;
the P2P client of the P2P group supports a WLAN Direct connection with the P2P group owner component of the subscriber access device for communicating with other members of the P2P group;
a connection between the proxy component and the access point component of the subscriber access device is electrically conductive rather than over-the-air; and
the one or more legacy wireless STAs of the WLAN support a Wi-Fi protected setup (WPS) connection with the access point component of the subscriber access device for communicating over the WLAN but do not support a WLAN Direct connection with the P2P group owner component of the subscriber access device.

12. The subscriber access device of claim 11, wherein:
the WLAN Direct connection between the P2P group owner component of the subscriber access device and the P2P client of the P2P group utilizes a first basic service set (BSS) or a first radio frequency (RF) band; and
the WPS connection between the access point component of the subscriber access device and the one or more legacy wireless STAs of the WLAN utilizes a second BSS or a second RF band that is different from the first BSS or the first RF band.

13. One or more non-transitory computer readable media having instructions operable to cause one or more processors of a subscriber access device to perform operations for facilitating communication between devices that are configured according to different wireless network infrastructures, via a proxy component of the subscriber access device that is configured to bridge traffic between peer-to-peer (P2P) clients of a P2P group that support WLAN Direct connection and legacy wireless stations (STAs) of a wireless local area network (WLAN) that do not support WLAN Direct connection with the P2P clients of the P2P group, the operations comprising:
receiving a message from a P2P client of the P2P group, wherein the message is received at the proxy component of the subscriber access device and is directed to one or more of the legacy wireless STAs of the WLAN that do not support WLAN direct connection with the P2P client of the P2P group;
modifying a source address of the message by the proxy component, wherein the modifying includes a filtering process using one or more IPtables;
transmitting the message from the subscriber access device to the one or more legacy wireless STAs of the WLAN;
receiving a response to the message from at least one of the one or more legacy wireless STAs of the WLAN, wherein the response is received at the proxy component of the subscriber access device and is directed to the P2P client of the P2P group that does not have WLAN Direct connection with the at least one of the one or more legacy wireless STAs of the WLAN from which the response was received;
modifying a source address and a destination address of the response to the message by the proxy component, wherein the modifying includes a filtering process using the one or more IPtables; and
transmitting the response to the message from the subscriber access device to the P2P client of the P2P group from which the message was received.

14. The one or more non-transitory computer-readable media of claim 13, wherein the P2P group is formed by a P2P group owner component of the subscriber access device that is connected to the proxy component of the subscriber access device.

15. The one or more non-transitory computer-readable media of claim 14, wherein:
the message is received at a virtual P2P client state-machine of the proxy component of the subscriber access device from the P2P client of the P2P group via the P2P group owner component of the subscriber access device;
the proxy component of the subscriber access device:
modifies a source IP address of the message by filtering a destination IP address of the message which belongs to an IP subnet of the WLAN that is different than an IP subnet of the P2P group, and wherein when the destination IP address matches an IPtables filtering parameter, the source IP address of the message is modified to conform to the IP subnet of the WLAN and sent through a kernel routing process; and
passes the message to a virtual station state-machine of the proxy component of the subscriber access device, wherein the virtual station state-machine outputs the message to an access point component of the subscriber access device that is connected to the proxy component; and
the access point component of the subscriber access device transmits the message to the one or more legacy wireless STAs of the WLAN.

16. The one or more non-transitory computer-readable media of claim 15, wherein:
the response is received at the virtual station state-machine of the proxy component of the subscriber access device from the at least one of the one or more legacy wireless STAs of the WLAN via the access point component of the subscriber access device; and
the proxy component of the subscriber access device:
modifies a source IP address and a destination IP address of the response to the message by filtering the destination IP address of the response which belongs to the IP subnet of the WLAN, wherein when the destination IP address matches an IPtables filtering parameter, the source IP address and the destination IP address of the response are modified to conform to the subnet of the P2P group and sent through a kernel routing process; and
passes the message to the virtual P2P client state-machine of the proxy component of the subscriber access device, wherein the virtual P2P client state-machine outputs the response to the P2P group owner component of the subscriber access device; and
the P2P group owner component of the subscriber access device transmits the response to the message to the P2P client of the P2P group.

17. The one or more non-transitory computer-readable media of claim 16, wherein:
a connection between the proxy component and the P2P group owner component of the subscriber access device is electrically conductive rather than over-the-air;
the P2P client of the P2P group supports a WLAN Direct connection with the P2P group owner component of the subscriber access device for communicating with other members of the P2P group;

a connection between the proxy component and the access point component of the subscriber access device is electrically conductive rather than over-the-air; and the one or more legacy wireless STAs of the WLAN support a Wi-Fi protected setup (WPS) connection with the access point component of the subscriber access device for communicating over the WLAN but do not support a WLAN Direct connection with the P2P group owner component of the subscriber access device.

18. The one or more non-transitory computer-readable media of claim 17, wherein:

the WLAN Direct connection between the P2P group owner component of the subscriber access device and the P2P client of the P2P group utilizes a first basic service set (BSS) or a first radio frequency (RF) band; and the WPS connection between the access point component of the subscriber access device and the one or more legacy wireless STAs of the WLAN utilizes a second BSS or a second RF band that is different from the first BSS or the first RF band.

* * * * *